(12) United States Patent  
Nakamura et al.

(10) Patent No.: US 6,825,873 B2  
(45) Date of Patent: Nov. 30, 2004

(54) TV PHONE APPARATUS

(75) Inventors: Yoshitaka Nakamura, Tokyo (JP); Naoki Hikishima, Tokyo (JP)

(73) Assignee: NEC Corporation, Tokyo (JP)

( * ) Notice: Subject to any disclaimer, the term of this patent is extended or adjusted under 35 U.S.C. 154(b) by 98 days.

(21) Appl. No.: 10/155,130

(22) Filed: May 28, 2002

(65) Prior Publication Data

US 2002/0180864 A1 Dec. 5, 2002

(30) Foreign Application Priority Data

May 29, 2001 (JP) ........................................ 2001-161031

(51) Int. Cl.⁷ .............................................. H04M 7/14
(52) U.S. Cl. ................................ 348/14.02; 348/14.11
(58) Field of Search ......................... 348/14.01–14.16; 379/93.17, 93.21, 93.23, 110.01

(56) References Cited

U.S. PATENT DOCUMENTS 5,987,104 A  * 11/1999  Tomimori ................ 379/93.23

6,590,601 B2  * 7/2003  Sukeno et al. ............ 348/14.01

FOREIGN PATENT DOCUMENTS

| EP | 1 148 725 A2 | 10/2001 | |
| JP | 03018192 A * | 1/1991 | ............ H04N/7/14 |
| JP | 9-331509 | 12/1997 | |
| JP | 9331509 | 12/1997 | |
| JP | 2000175168 | 6/2000 | |
| JP | 2000-175168 | 6/2000 | |
| JP | 2001069473 | 3/2001 | |
| JP | 2001127990 | 5/2001 | |

* cited by examiner

*Primary Examiner*—Wing F. Chan  
(74) *Attorney, Agent, or Firm*—Young & Thompson (57) ABSTRACT

A TV phone apparatus includes an image sensing element, ROM, CG processing section, and radio antenna. The image sensing element photographs a real video of a speaker. The ROM stores in advance at least one substitute video of the speaker. The CG processing section extracts substitute video data from the ROM in place of real video data output from the image sensing element and executes graphics processing. The radio antenna transmits the substitute video data output from the CG processing section to a partner of speech communication.

10 Claims, 8 Drawing Sheets

| FILE LENGTH | |
|---|---|
| POINTER TO OUTLINE FILE | LAYOUT POSITION |
| POINTER TO HAIR FILE | LAYOUT POSITION |
| POINTER TO EYEBROW FILE | LAYOUT POSITION |
| POINTER TO EYE FILE | LAYOUT POSITION |
| POINTER TO NOSE FILE | LAYOUT POSITION |
| POINTER TO MOUTH FILE | LAYOUT POSITION |
| POINTER TO EAR FILE | LAYOUT POSITION |
| POINTER TO ACCESSORY FILE #1 | LAYOUT POSITION |
| ⋮ | |
| POINTER TO ACCESSORY FILE #N | LAYOUT POSITION |

TV PHONE APPARATUS

BACKGROUND OF THE INVENTION

The present invention relates to a TV phone apparatus which executes communication between remote sites using voice and video.

A conventional telephone apparatus serving as a communication tool between remote sites only functions as a voice transmission means and is not sufficient as an emotion transmission means. Recently, TV phone apparatuses capable of communication using both voice and video are used.

Since a TV phone transmits not only voice but also the appearance of a speaker and background to the partner as a video, all callers can know the privacy of the speaker. Especially, when a person is suddenly called, and he does not want to show his appearance or background, he must select speech communication using only voice without transmitting any video.

As an alternate method, a TV phone apparatus has been proposed in Japanese Patent Laid-Open No. 9-331509 or 2000-175168, in which a substitute video such as a character image is transmitted instead of a real video whereby the emotion of the speaker is transmitted using the image while protecting his privacy. However, in such a TV phone apparatus, since a substitute video is loaded from a personal computer or the like, the telephone apparatus itself cannot edit and generate a substitute video to be transmitted.

SUMMARY OF THE INVENTION

It is an object of the present invention to provide a TV phone apparatus capable of transmitting the emotion of a speaker using an image while protecting his privacy.

It is another object of the present invention to provide a TV phone apparatus capable of editing and generating a substitute video to be transmitted by the telephone apparatus itself.

In order to achieve the above objects, according to the present invention, there is provided a TV phone apparatus comprising image sensing means for photographing a real video of a speaker, first storage means for storing in advance at least one substitute video of the speaker, processing means for extracting substitute video data from the first storage means in place of real video data output from the image sensing means and executing graphics processing, and transmission means for transmitting the substitute video data output from the processing means to a partner of speech communication.

DESCRIPTION OF THE PREFERRED EMBODIMENT

The present invention will be described below in detail with reference to the accompanying drawings.

Figure 1:
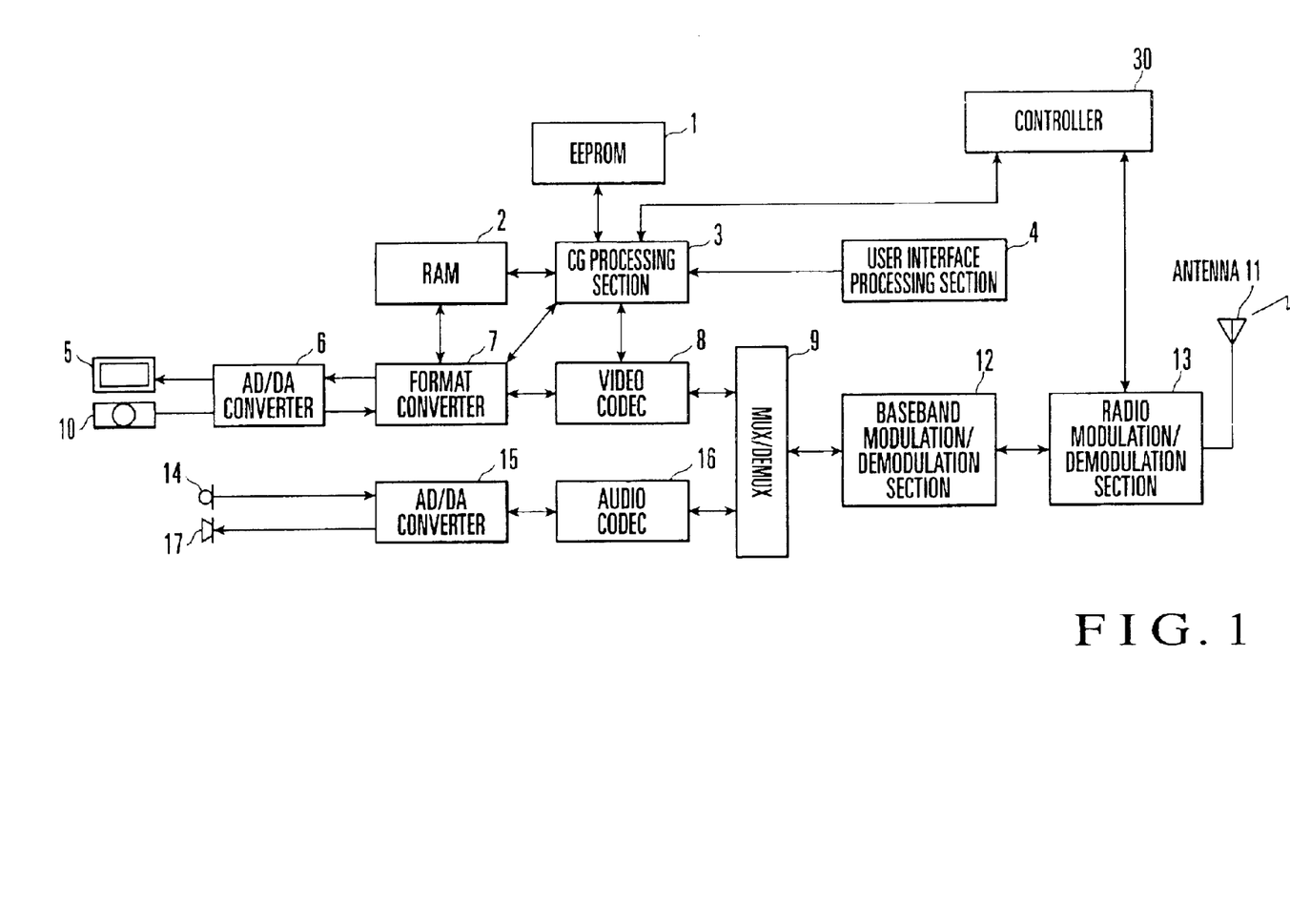
FIG. 1 is a block diagram of a portable TV phone apparatus according to an embodiment of the present invention.

FIG. 1 shows a portable TV phone apparatus according to an embodiment of the present invention. Referring to FIG. 1, an EEPROM (Electrically Erasable and Programmable Read Only Memory) 1 stores graphic data. A RAM 2 stores temporary data.

A CG (Computer Graphics) processing section 3 processes graphic data read out from the ROM 1. The data processed by the CG processing section 3 is used by a format converter 7 or video codec 8. A user interface processing section 4 transmits an instruction from a user to the CG processing section 3. A display device 5 such as a liquid crystal panel displays an analog output video from an AD/DA converter 6.

The AD/DA converter 6 converts the digital signal from the format converter 7 into an analog signal usable by the display device 5 and also converts the analog signal from an image sensing element 10 into a digital signal usable by the format converter 7. The format converter 7 converts signals between the AD/DA converter 6, the video codec 8, and the CG processing section 3. The video codec 8 compresses or expands a video signal.

A multiplex/demultiplex section (MUX/DEMUX) 9 multiplexes a video signal from the video codec 8 and a voice signal from an audio codec 16 (to be described later) and transfers the multiplexed signal to a baseband modulation/demodulation section 12. The multiplex/demultiplex section 9 also demultiplexes a received signal from the baseband modulation/demodulation section 12 into voice and video signals. The image sensing element 10 photographs the image of a user and outputs an analog video signal. A radio antenna 11 transmits/receives a radio wave.

The baseband modulation/demodulation section 12 baseband-modulates a signal from the multiplex/demultiplex section 9 and outputs the signal to a radio modulation/demodulation section 13. The baseband modulation/demodulation section 12 also baseband-demodulates a signal from the radio modulation/demodulation section 13 and outputs the signal to the multiplex/demultiplex section 9. The radio modulation/demodulation section 13 radio-modulates a signal from the baseband modulation/demodulation section 12 and outputs the signal to the radio antenna 11. The radio modulation/demodulation section 13 also radio-demodulates a signal received by the radio antenna 11 and outputs the signal to the baseband modulation/demodulation section 12.

A microphone 14 receives user's voice and outputs an analog voice signal to an AD/DA converter 15. The AD/DA converter 15 converts a digital signal from the audio codec 16 into an analog voice signal usable by a loudspeaker 17 and also converts an analog voice signal from the microphone 14 into a digital signal usable by the audio codec 16. The audio codec 16 compresses or expands a voice signal. The loudspeaker 17 reproduces an analog signal sent from the AD/DA converter 15. A controller 30 controls the entire portable TV phone apparatus, including calling/call receiving control and CG processing control.

The calling/call receiving operation of the portable TV phone apparatus (to be referred to as a TV phone hereinafter) having the above arrangement will be described next with reference to FIGS. 2 and 3.

Figure 2:
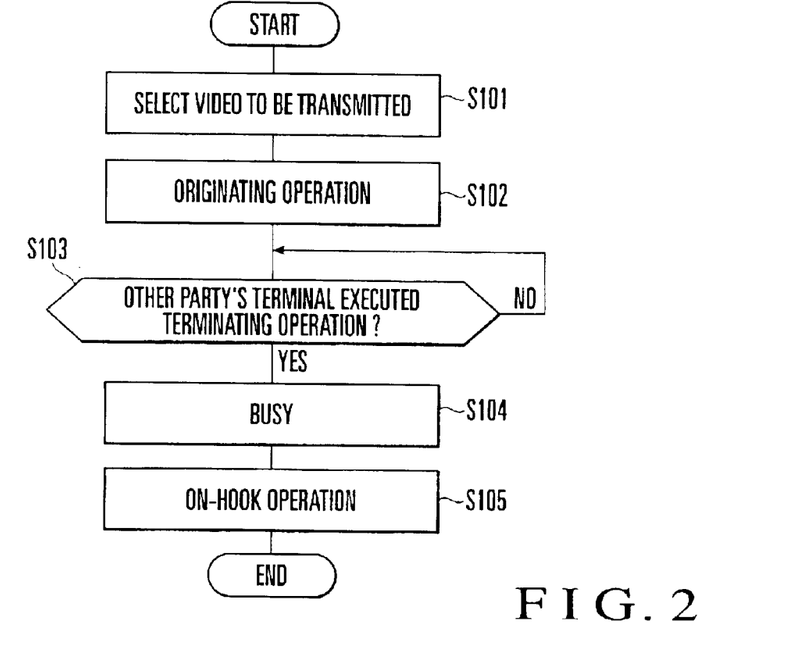
FIG. 2 is a flow chart showing a calling procedure from the portable TV phone apparatus shown in FIG. 1.

As shown in FIG. 2, the user of the TV phone selects whether a real video photographed by the image sensing element 10 should be transmitted to the other party's terminal or a substitute video (still image or moving image) modeled after the user's face should be transmitted to the other party's terminal (step S101). If no selection is done within a predetermined time in step S101, a preset image is transmitted to the other party's terminal.

After selection, the controller 30 executes originating operation of calling the other party's terminal (step S102). By terminating operation (response) of the other party's terminal, speech communication starts, and a busy state is set (steps S103 and S104). When speech communication is ended, the controller 30 executes on-hook operation of disconnecting the channel from the other party's terminal (step S105). During speech communication, the video to be transmitted can be arbitrarily switched.

Figure 3:
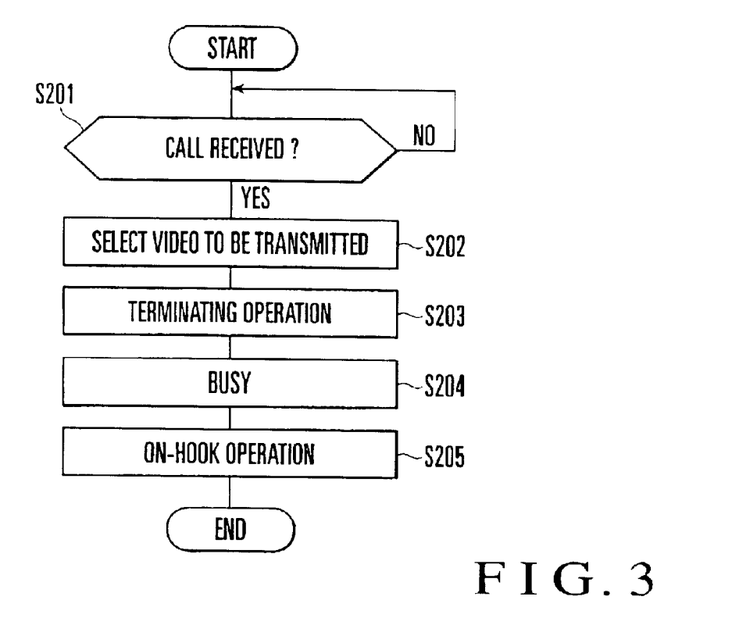
FIG. 3 is a flow chart showing a call receiving procedure in the portable TV phone apparatus shown in FIG. 1.

As shown in FIG. 3, upon being called from the other party's terminal (step S201), the user of the TV phone selects whether a real video photographed by the image sensing element 10 should be transmitted to the other party's terminal or a substitute video modeled after the user's face should be transmitted to the other party's terminal (step S202). If no selection is done within a predetermined time in step S202, a preset image is transmitted to the other party's terminal.

After selection, the controller 30 executes terminating operation of responding to the call from the other party's terminal (step S203). When speech communication starts, a busy state is set (step S204). When speech communication is ended, the controller 30 executes on-hook operation of disconnecting the channel from the other party's terminal (step S205).

Figure 4:
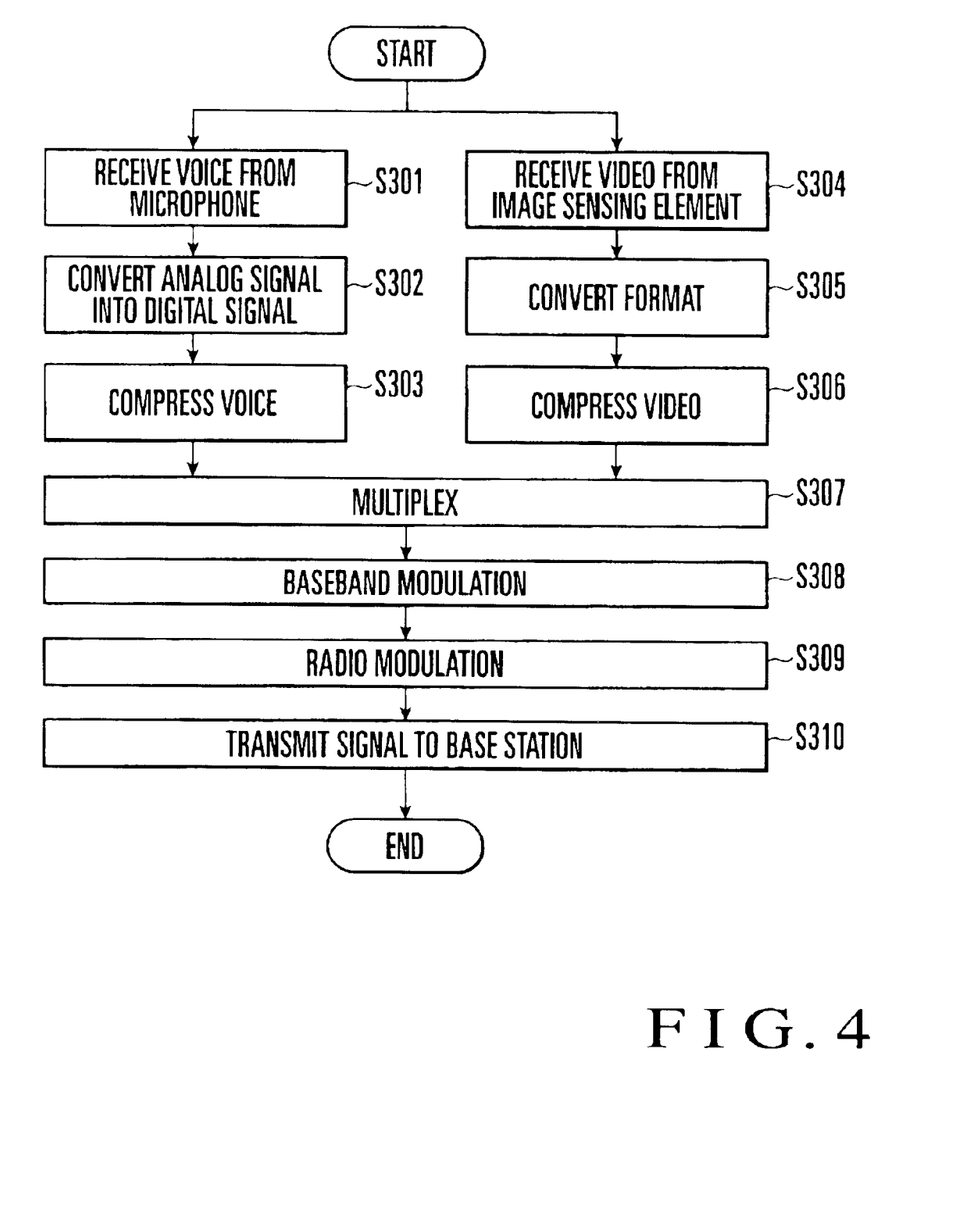
FIG. 4 is a flow chart showing a procedure of transmitting a real video from the portable TV phone apparatus shown in FIG. 1 to the terminal of the other party.

Image transmitting operation during speech communication in step S104 or S204 will be described next with reference to FIGS. 4 and 5. In the voice processing system, upon receiving an analog voice signal from the microphone 14 (step S301) as shown in FIG. 4, the AD/DA converter 15 converts the received analog voice signal into a digital voice signal (step S302). The audio codec 16 compresses the digital voice signal received from the AD/DA converter 15 using a scheme (e.g., ITU-T G.723.1, 3GPP AMR, or the like) defined for TV phones (step S303).

On the other hand, in the image processing system, upon receiving an analog video signal from the image sensing element 10 (step S304), the AD/DA converter 6 converts the analog video signal into a digital video signal, and the format converter 7 converts the digital video signal into a digital signal with a YUV format which comprises a luminance component Y and color difference components U and V (step S305). The video codec 8 compresses the YUV signal received from the format converter 7 using a scheme (e.g., ITU-T H.263, ISO/IEC, MPEG4, or the like) defined for TV phone apparatuses (step S306).

The above processes are simultaneously executed in the voice and video processing systems. The multiplex/demultiplex section 9 multiplexes the voice signal received from the audio codec 16 and the video signal received from the video codec 8 (step S307). The baseband modulation/demodulation section 12 baseband-modulates the multiplexed signal received from the multiplex/demultiplex section 9 (step S308). The radio modulation/demodulation section 13 radio-modulates the signal received from the baseband modulation/demodulation section 12 and outputs the signal to the radio antenna 11 (step S309). A transmission wave obtained by the radio modulation/demodulation section 13 is transmitted from the radio antenna 11 to a base station (step S310).

Operation of transmitting a substitute video formed from a still image or moving image in place of a real video will be described next with reference to FIG. 5. Processing in steps S401 to S403 and S407 to S410 shown in FIG. 5 is the same as that in steps S301 to S303 and S307 to S310 in FIG. 4, and a description thereof will be omitted.

In the video processing system, instead of a real video photographed by the image sensing element 10, data having a preset GIF (Graphic Interchange Format) or JPEG (Joint Photographic coding Experts Group) format (if no format is set in advance, standard data) is selected from graphic data (to be referred to as CG data hereinafter) stored in the ROM 1 and used.

Figure 6:
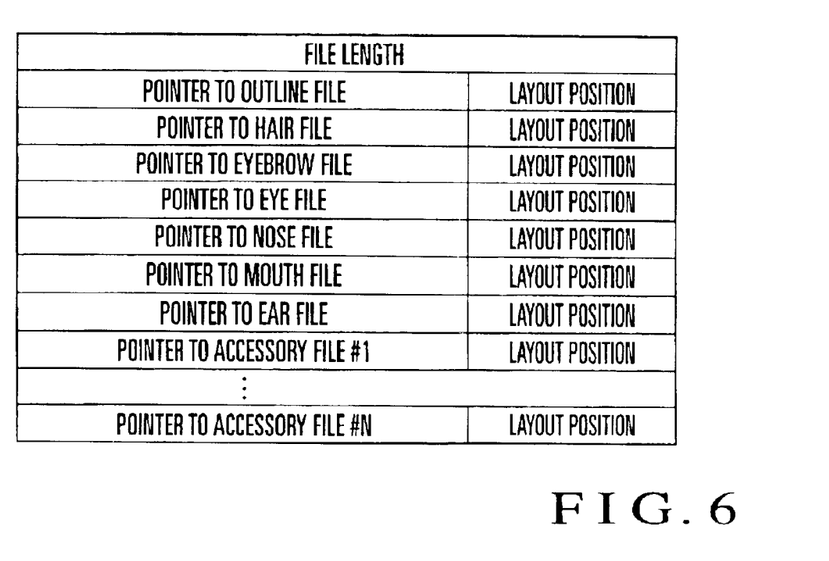
FIG. 6 is a view showing the format of substitute video definition data.

Substitute video definition data that defines a substitute video has a format which comprises pointers that indicate the storage positions of files of CG data such as "face outline", "hair style (hair)", "eyebrow", "eye", "nose", "mouth", "ear", and "accessories" such as ribbons, pieces of information representing the layout positions of "outline", "hair", "eyebrow", "eye", "nose", "mouth", "ear", and "accessories" in the substitute video, and a file length, as shown in FIG. 6.

Figure 7:
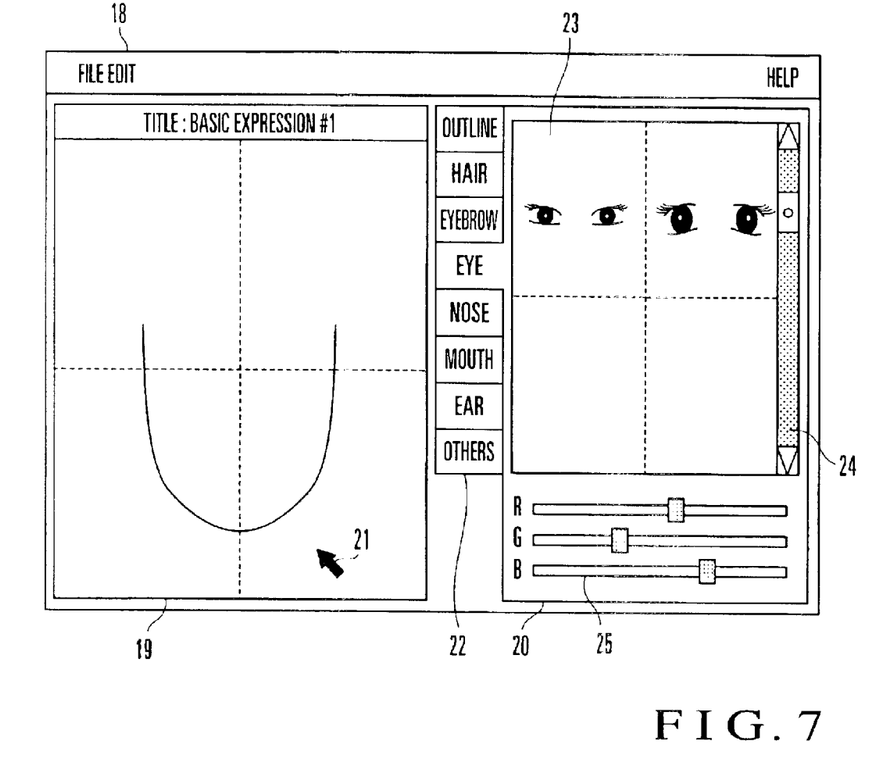
FIG. 7 is a view showing a substitute video generation window.

The CG processing section 3 provides a generation window on the display device 5 to the user to generate a substitute video, as shown in FIG. 7. The generation window shown in FIG. 7 is mainly constituted by a tool bar 18, main draw window 19, part selection window 20, and selection pointer 21.

Figure 8:
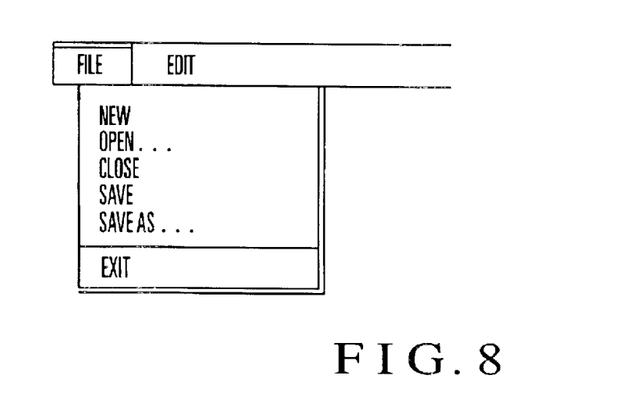
FIG. 8 is a view showing a state when the tool bar on the generation window is operated.

The user can operate the selection pointer 21 through the user interface processing section 4. More specifically, when a function "File", "Edit", or "Help" on the tool bar 18 is selected using the selection pointer 21, a pull-down submenu is displayed, as shown in FIG. 8. When a function in the submenu is selected with the selection pointer 21, desired processing can be executed. When "File" is selected, a function "Create new substitute video", "Save file", "Update file", or the like can be selected. When "Edit" is selected, a function "Undo", "Copy", "Paste", or the like can be selected. When "Help" is selected, a function of "Retrieve help file" or the like can be selected.

Graphics under drawing is displayed on the main draw window 19. FIG. 7 shows a state wherein a face outline is laid out in the main draw window 19. The part selection window 20 is prepared for each of portions such as "outline", "hair", "eyebrow", "eye", "nose", "mouth", "ear", and "others (accessories)". The user selects a desired portion from tubs 22 at the left end using the selection pointer 21, thereby switching the part selection window 20. FIG. 7 shows a state wherein "eye" is selected from the portions.

A plurality of standard CG data are prepared in the ROM 1 in advance for each of "outline", "hair", "eyebrow", "eye", "nose", "mouth", "ear", and "others (accessories)". These standard CG data may be stored in advance in another storage device (second storage means) in place of the ROM 1. When the part selection window 20 of a given portion is selected, the CG processing section 3 displays a plurality of graphics prepared in advance for the selected portion in a display region 23 of the part selection window 20. The user can select a desired graphic from the displayed graphics using the selection pointer 21.

If the number of graphics is large, some of them are displayed in the display region 23. When the user moves a scroll bar 24 at the right end using the selection pointer 21, the CG processing section 3 scrolls the display region 23 in accordance with the movement. Hence, the user can see all graphics prepared for the selected portion.

Three sliders 25 representing the gray levels of the three primary colors R (red), G (green), and B (blue) of light (each color has 256 gray levels) are arranged on the lower side of the part selection window 20. The user selects a desired graphic from those displayed in the display region 23 and then moves the sliders 25 for the respective colors using the selection pointer 21, thereby changing the gray levels of RGB of the selected graphic. With this operation, the color of the selected graphic can be determined. For example, when (R,G,B)=(0,0,0), the color is black. When (R,G,B)= (255,255,255), the color is white.

The user can lay out the selected graphic on the main draw window 19 by grapping it using the selection pointer 21. For the main draw window 19, an X-axis is set in the horizontal direction, and a Y-axis is set in the vertical direction. An origin (X,Y)=(0,0) is set at the upper left corner. With these settings, the CG processing section 3 can recognize the coordinates at which the graphic is laid out on the main draw window 19. The coordinates are used as information representing the layout position of the graphic in the substitute video definition data shown in FIG. 6.

With the above procedure, graphics are selected for "outline", "hair", "eyebrow", "eye", "nose", "mouth", "ear", and "accessories", and colors are determined. The graphics of the respective portions are laid out on the main draw window 19, thereby making a substitute video modeled after the user's face. After the end of substitute video generation, when the user selects "Save" from the submenu of "File" on the tool bar 18, the CG processing section 3 stores CG data of each portion of the generated substitute video in the ROM 1. The CG processing section 3 also generates substitute video definition data shown in FIG. 6, which is formed from pointers to the CG data of the respective portions, the layout positions of the CG data of the respective portions, and a file length, and stores the substitute video definition data in the ROM 1.

Figure 5:
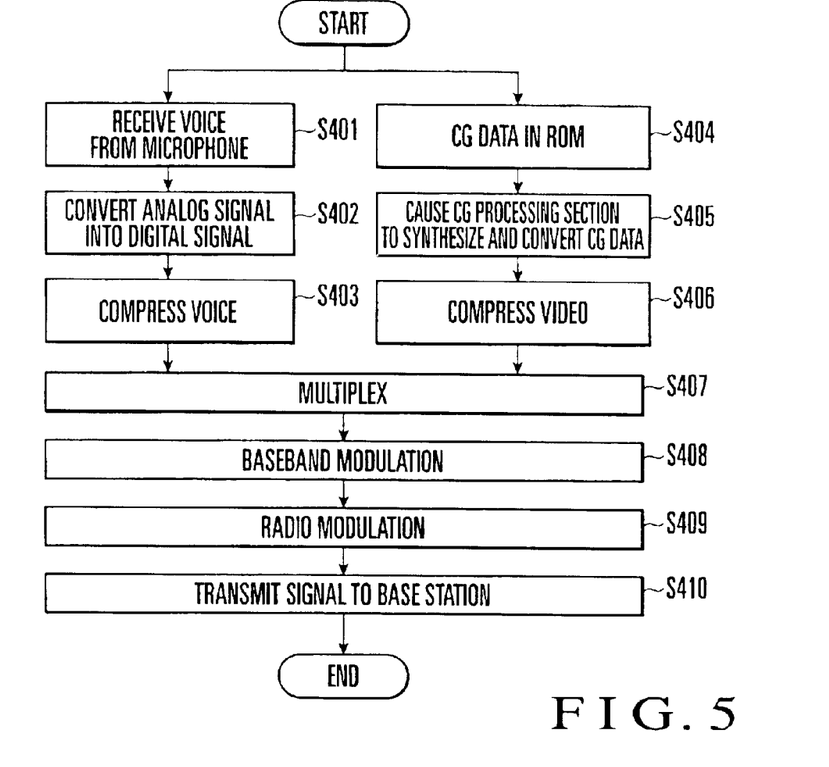
FIG. 5 is a flow chart showing a procedure of transmitting a substitute video from the portable TV phone apparatus shown in FIG. 1 to the terminal of the other party.

In step S404 of FIG. 5, the CG processing section 3 extracts the substitute video definition data generated and registered in advance from the ROM 1. The CG processing section 3 extracts the CG data of each portion from the ROM 1 on the basis of the pointer in the substitute video definition data and lays out the extracted CG data in the substitute video on the basis of corresponding layout position information in the substitute video definition data. The CG data of the respective portions are synthesized to generate substitute video data. The CG processing section 3 transfers the generated substitute video data to the format converter 7 to convert the data into a digital signal with a YUV format (step S405). After conversion, the format converter 7 outputs the YUV signal to the CG processing section.

As in the case of a real video, the video codec 8 compresses the YUV signal output from the CG processing section 3 using a scheme (e.g., ITU-T H.263, ISO/IEC, MPEG4, or the like) defined for TV phone apparatuses (step S406). With processing in steps S407 to S410, the compressed data is transmitted to the other party's terminal.

To transmit not a still image but a substitute video of a moving image, a plurality of substitute video definition data are generated and registered in advance. The CG processing section 3 continuously synthesizes CG data for each substitute video definition data on the basis of the substitute video definition data. With this processing, a substitute video of a moving image can be transmitted.

Figure 9A:
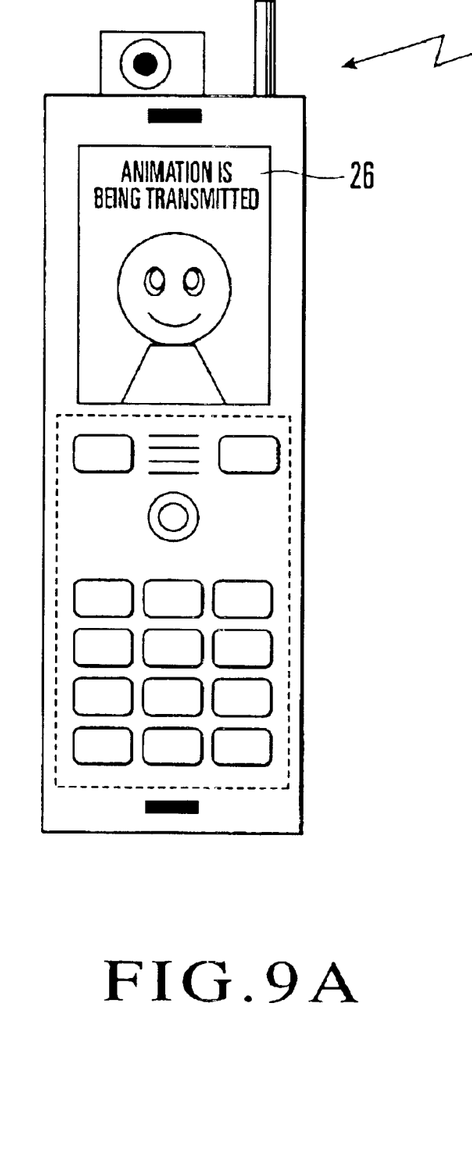
FIGS. 9A and 9B are views showing the states of transmitting- and receiving-side TV phone apparatuses during speech communication.
Figure 9B:
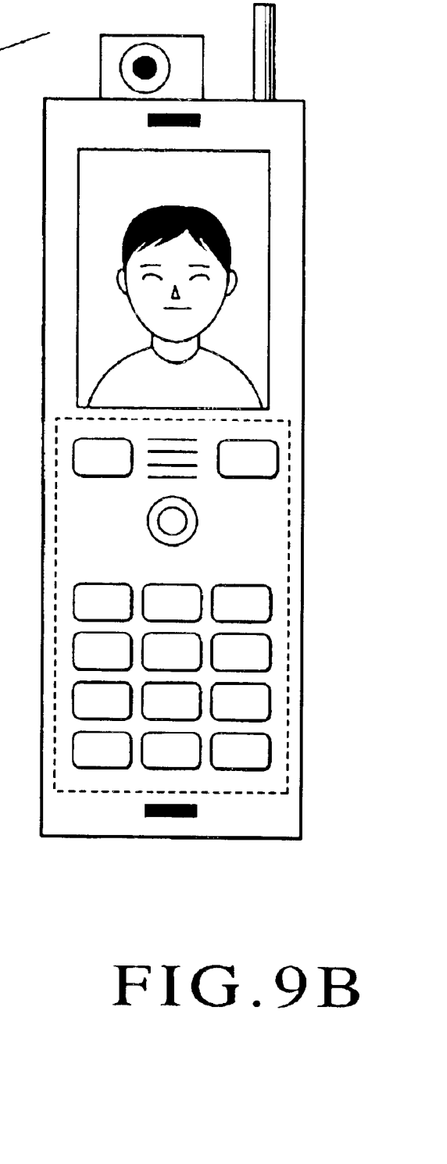

It is possible not only to transmit a substitute video modeled after the user's face but also to simultaneously transmit CG data of a character string, e.g., "animation is being transmitted". In this case, CG data of a character string is prepared in advance. When a pointer to the CG data and the layout position of the CG data are defined in a substitute video definition data, the character string is added in the substitute video and transmitted. As shown in FIG. 9B, the real video of the receiving-side user is displayed on the TV phone on the transmitting side. On the TV phone on the receiving side, as shown in FIG. 9A, an annotation 26 "animation is being transmitted" is added to the substitute video and displayed together with the substitute video of the moving image of the transmitting-side user.

Figure 10:
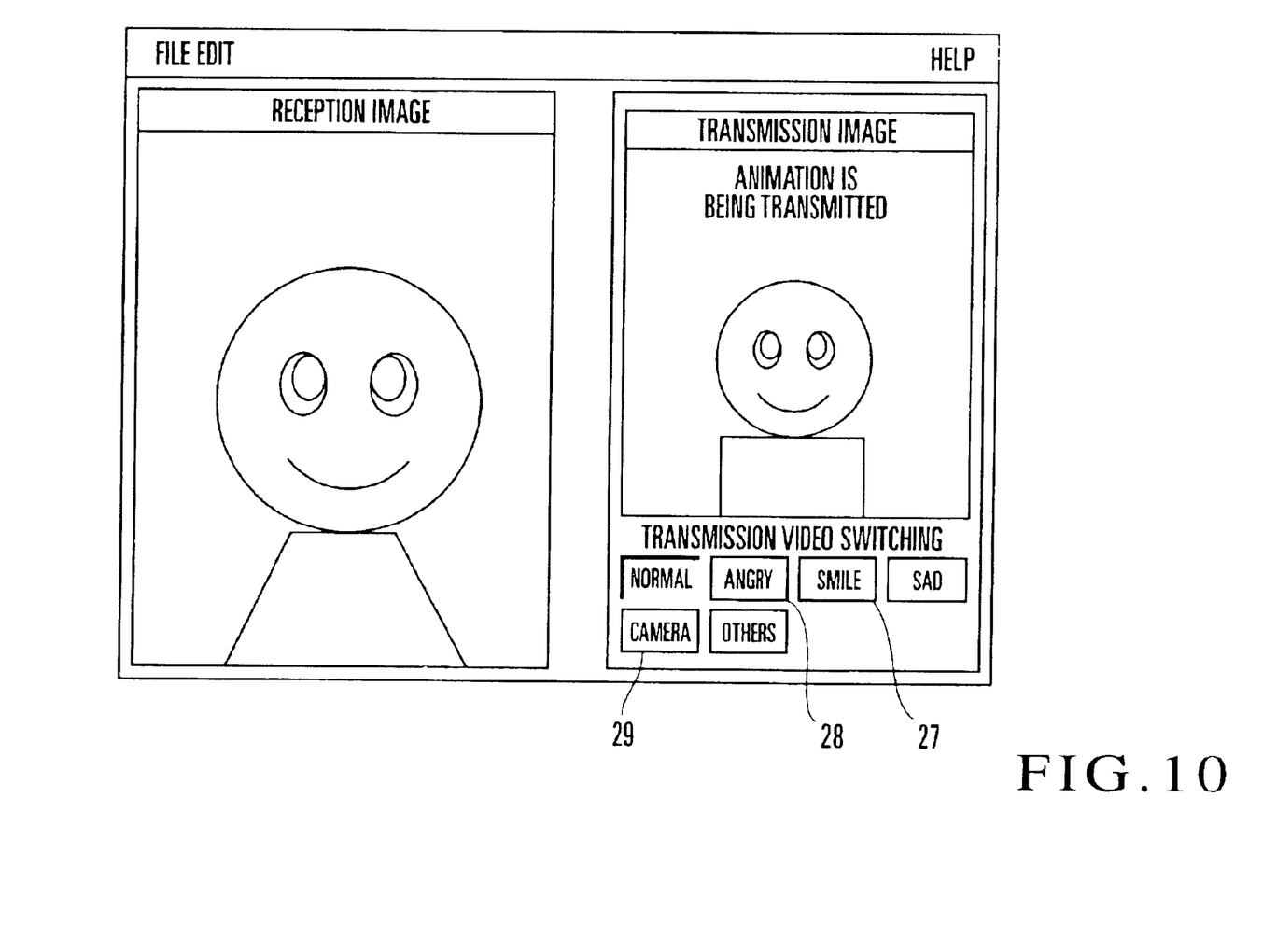
FIG. 10 is a view showing the display screen of the TV phone apparatus during speech communication.

To change the substitute video to be transmitted during speech communication, the user appropriately selects and changes the video to be transmitted through the user interface processing section 4. For example, as shown in FIG. 10, when the user wants to send smiling facial expression, he selects a button "smile" 27. To send angry facial expression, the user selects a button "anger" 28.

The CG data and substitute video definition data of smiling facial expression, the CG data and substitute video definition data of angry facial expression, the CG data and substitute video definition data of sad facial expression, and the like are prepared in the ROM 1 in advance. The CG processing section 3 synthesizes CG data on the basis of substitute video definition data corresponding to user's selection to generate a substitute video. With this processing, a still image or moving image of smiling facial expression, a still image or moving image of angry facial expression, a still image or moving image of sad facial expression, or the like can be sent.

When the user has determined to send a real video photographed by the image sensing element 10 during speech communication, he selects a button "camera" 29 in FIG. 10. When the button 29 is operated, the CG processing section 3 stops outputting the substitute video (YUV signal) to the video codec 8. Simultaneously, the format converter 7 starts processing of converting the output from the AD/DA converter 6 into the YUV format. The video processing is switched from processing in steps S404 to S406 of FIG. 5 to processing in steps S304 to S306 of FIG. 4.

Figure 11:
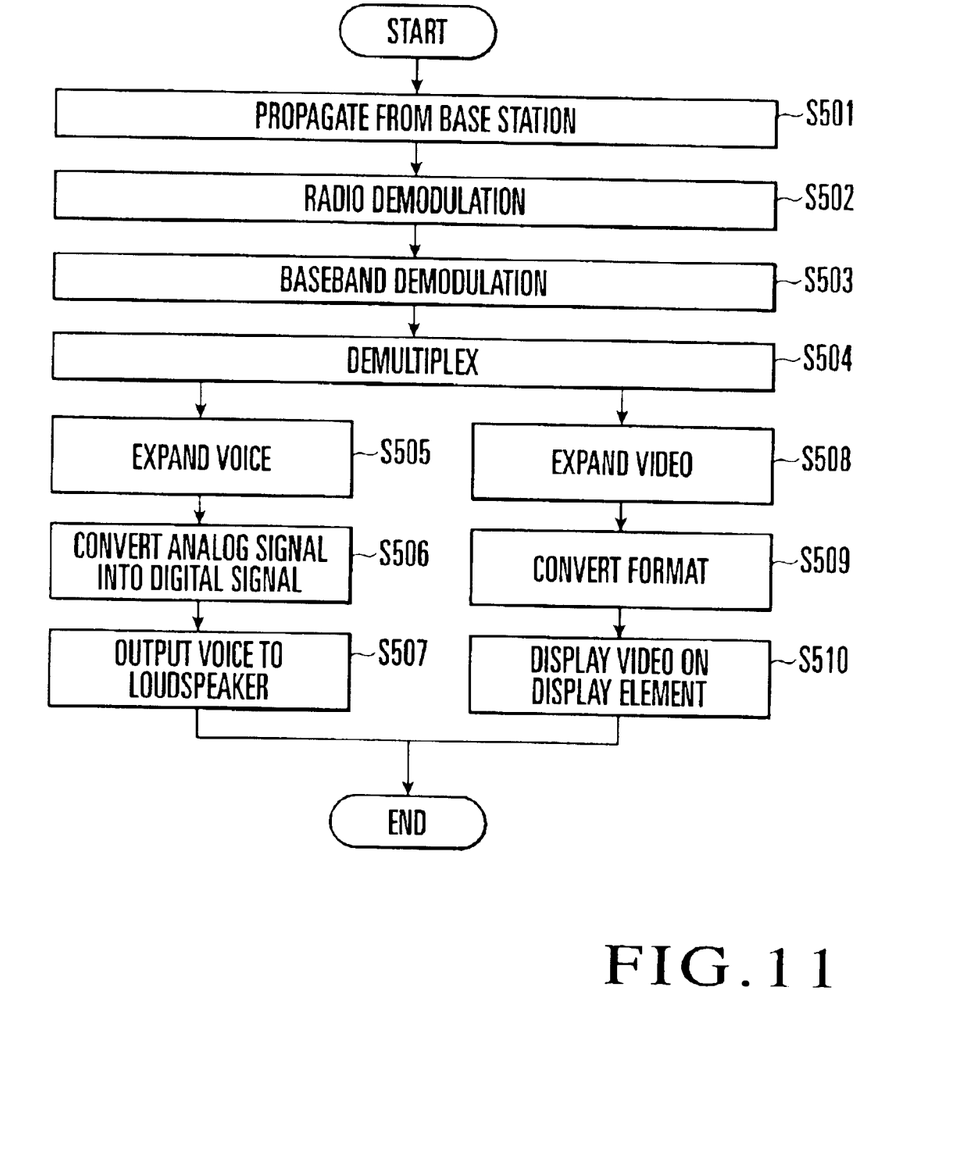
FIG. 11 is a flow chart showing a reception procedure in the portable TV phone apparatus shown in FIG. 1.

The receiving operation of the TV phone will be described next with reference to FIG. 11. A reception wave sent from a base station and received by the radio antenna 11 is radio-demodulated by the radio modulation/demodulation section 13 (steps S501 and S502). The baseband modulation/demodulation section 12 baseband-demodulates the signal output from the radio modulation/demodulation section 13 (step S503). The multiplex/demultiplex section 9 demultiplexes the multiplex signal output from the baseband modulation/demodulation section 12 into a voice signal and video signal (step S504).

In the voice processing system, the audio codec 16 expands the digital voice signal output from the multiplex/ demultiplex section 9 (step S505). The AD/DA converter 15 converts the expanded digital voice signal into an analog voice signal and outputs it to the loudspeaker 17 (step S506). With this processing, the voice on the transmitting side is output from the loudspeaker 17 (step S507).

On the other hand, in the video processing system, the video codec 8 expands the digital video signal output from the multiplex/demultiplex section 9 (step S508). The format converter 7 converts the format of the YUV signal output from the video codec 8 (step S509). The AD/DA converter 6 converts the digital video signal received from the format converter 7 into an analog video signal and outputs it to the display device 5. With this processing, the video on the transmitting side is displayed on the screen of the display device 5 (step S510).

In the above embodiment, a portable TV phone apparatus has been exemplified. However, the present invention is not limited to this. When the baseband modulation/demodulation section 12, radio modulation/demodulation section 13, and radio antenna 11 are changed to devices for an arbitrary transmission scheme, a TV phone of that transmission scheme can be implemented. For example, the present invention can also be applied to a cable TV phone using PSTN (Public Switched Telephone Network) or ISDN (Integrated Service Digital Network).

Additionally, in the above embodiment, the format conversion section 7 is used for format conversion of both real video data and substitute video data. Instead, a format conversion section dedicated to substitute video data may be arranged in the CG processing section 3. In this case, exchange of substitute video data between the CG processing section 3 and the format converter 7 is unnecessary. The two format converters are controlled to selectively operate.

As has been described above, according to the present invention, a substitute video of a still image such as a portrait or a moving image is transmitted to the partner of speech communication instead of the real video of the speaker, thereby notifying the partner of speech communication that the speaker is hard to show himself on the screen. Hence, the emotion of the speaker can be transmitted by an image while protecting the privacy. In addition, since a moving image modeled after the speaker's facial expression is transmitted, communication with the TV phone can be executed without any feeling of wrongness for the speech communication partner.

A substitute video is converted into a video signal format of the TV phone apparatus and transmitted. Hence, the substitute video can be transmitted to the other party's terminal without requiring a dedicated reproducing function of the other party's terminal.

One of a substitute video stored in a storage means and a real video photographed by an image sensing means can be selectively transmitted. In addition, when a character string is transmitted together with a substitute video, the substitute video and character string can be simultaneously displayed on the communication partner side.

A substitute video to be transmitted can be selected from a plurality of substitute videos prepared in advance and transmitted. For example, a substitute video of smiling facial expression, a substitute video of angry facial expression can be sent, or a substitute video of sad facial expression can be selectively transmitted.

A part video as a component of a substitute video is freely selected from a plurality of part videos prepared in advance, thereby generating a substitute video. Hence, the substitute video can be edited and generated by the telephone apparatus itself and transmitted.

A substitute video can be generated while freely changing the color of each part video. Furthermore, the position of each part video in the substitute video can be freely set.

What is claimed is:

1. A TV phone apparatus comprising:

image sensing means for photographing a real video of a speaker;

first storage means for storing in advance at least one substitute video of the speaker that is the cartoon caricature modeled after the speaker's face;

processing means for extracting substitute video data from said first storage means in place of real video data output from said image sensing means and outputting character strings of computer graphics data;

transmission means for transmitting the character strings of computer graphics data output from said processing means to a partner of speech communication; and second storage means for storing in advance a plurality of part video data as components of the substitute video data, wherein said processing means selects necessary part video data from the part video data stored in said second storage means to synthesize the substitute video data in accordance with an instruction from the speaker, and stores the synthesized substitute video data in said first storage means.

2. An apparatus according to claim 1, wherein said processing means selects one of the substitute video data extracted from said first storage means and the real video data output from said image sensing means and executes graphics processing in accordance with an instruction from the speaker.

3. The apparatus of claim 1, wherein said character strings of computer graphics data include an animated cartoon including changing facial features on the caricature modeled after the speaker's face.

4. An apparatus according to claim 1, wherein said first storage means stores a plurality of substitute video data in advance, and said processing means selects the substitute video data from among the plurality of substitute video data stored in said first storage means and executes graphics processing in accordance with an instruction from the speaker.

5. The apparatus of claim 1, wherein said processing means includes selection means for changing facial features on the caricature modeled after the speaker's face to express an emotion.

6. An apparatus according to claim 1, wherein said processing means changes a color of each of the selected part videos in accordance with an instruction from the speaker.

7. An apparatus according to claim 1, wherein said processing means determines a position of each part video in the substitute video in accordance with an instruction from the speaker.

8. An apparatus according to claim 1, further comprising conversion means for converting the substitute video data extracted from said first storage means and the real video data output from said image sensing means into a digital video signal format, and compression means for compressing a digital video signal output from said conversion means and outputting the signal to said transmission means.

9. An apparatus according to claim 8, wherein said apparatus further comprises reception means for receiving compressed video data from the partner of speech communication, expansion means for expanding the compressed video data output from said reception means and outputting a digital video signal, and display means for displaying the received video, and said conversion means converts the format of the digital video signal output from said expansion means and outputs the signal to said display means.

10. An apparatus according to claim 1, wherein said processing means converts the substitute video data extracted from said first storage means into a digital video signal format.

* * * * *